United States Patent
Mufti et al.

(10) Patent No.: US 10,701,112 B2
(45) Date of Patent: Jun. 30, 2020

(54) IP-BASED USSD COMMUNICATIONS

(71) Applicant: T-Mobile USA, Inc., Bellevue, WA (US)

(72) Inventors: Shujaur Mufti, Snoqualmie, WA (US); Muhammad Ejaz Sial, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/629,976

(22) Filed: Jun. 22, 2017

(65) Prior Publication Data

US 2018/0041550 A1 Feb. 8, 2018

Related U.S. Application Data

(60) Provisional application No. 62/371,692, filed on Aug. 5, 2016.

(51) Int. Cl.
*H04L 29/06* (2006.01)
*H04W 8/08* (2009.01)
*H04L 29/08* (2006.01)

(52) U.S. Cl.
CPC ...... *H04L 65/1069* (2013.01); *H04L 65/1006* (2013.01); *H04L 65/1016* (2013.01); *H04L 65/1083* (2013.01); *H04L 65/1096* (2013.01); *H04W 8/082* (2013.01); *H04L 67/26* (2013.01)

(58) Field of Classification Search
CPC .................................................. H04L 65/1069
See application file for complete search history.

(56) References Cited

U.S. PATENT DOCUMENTS

| | | | | |
|---|---|---|---|---|
| 8,472,431 | B2* | 6/2013 | Siegel | H04L 65/1016 370/352 |
| 8,644,218 | B1* | 2/2014 | Pankajakshan | H04L 65/1016 370/328 |
| 2005/0058125 | A1* | 3/2005 | Mutikainen | H04L 29/12292 370/354 |
| 2005/0169253 | A1 | 8/2005 | Hu | |

(Continued)

FOREIGN PATENT DOCUMENTS

WO WO2013144778 10/2013

OTHER PUBLICATIONS

3GGP TS 29.002 v13.3.0 Technical Specification, ETSI TS 129 002 V13.3.0, Apr. 2016, 1031 pages.

(Continued)

*Primary Examiner* — Andrew Lai
*Assistant Examiner* — Andrew C Lee
(74) *Attorney, Agent, or Firm* — Lee & Hayes, P.C.

(57) ABSTRACT

A USSD (Unstructured Supplementary Service Data) message may be transmitted by a communication device to an IMS (IP Multimedia Subsystem) within a SIP (Session Initiation Protocol) INVITE message, where it is received by a TAS (Telephony Application Server). The TAS sends the USSD message to an HSS (Home Subscriber Service) of the IMS using an existing Diameter Sh interface between the TAS and the HSS. The HSS then communicates with a USSD gateway to obtain a USSD response, which is sent back to the TAS over the Diameter Sh interface. The TAS sends the USSD response to the communication device within a SIP BYE message.

20 Claims, 8 Drawing Sheets

(56) References Cited

U.S. PATENT DOCUMENTS

| | | | |
|---|---|---|---|
| 2005/0278447 A1* | 12/2005 | Raether | H04L 67/16 709/227 |
| 2006/0111134 A1* | 5/2006 | Mills | H04W 76/45 455/518 |
| 2007/0086581 A1* | 4/2007 | Zhu | H04M 7/127 379/88.17 |
| 2007/0121584 A1* | 5/2007 | Qiu | H04M 3/2218 370/352 |
| 2007/0173226 A1* | 7/2007 | Cai | H04L 12/14 455/405 |
| 2008/0117893 A1* | 5/2008 | Witzel | H04W 4/14 370/352 |
| 2008/0127232 A1* | 5/2008 | Langen | H04L 29/12188 719/328 |
| 2008/0186921 A1* | 8/2008 | Long | H04W 8/12 370/331 |
| 2008/0268847 A1* | 10/2008 | Mukherjee | H04W 36/005 455/436 |
| 2008/0285544 A1 | 11/2008 | Qiu et al. | |
| 2008/0299980 A1* | 12/2008 | Buckley | H04W 28/06 455/445 |
| 2009/0257417 A1* | 10/2009 | Allen | H04W 76/22 370/338 |
| 2010/0069101 A1* | 3/2010 | Mahdi | H04L 65/1016 455/466 |
| 2010/0074154 A1* | 3/2010 | Astrom | H04M 7/122 370/310 |
| 2010/0142517 A1* | 6/2010 | Montemurro | H04L 63/20 370/352 |
| 2010/0261490 A1* | 10/2010 | Berry | H04W 4/12 455/466 |
| 2010/0331023 A1* | 12/2010 | Cai | H04L 51/14 455/466 |
| 2011/0040836 A1* | 2/2011 | Allen | H04L 65/1093 709/205 |
| 2011/0044325 A1 | 2/2011 | Buckley | |
| 2011/0103373 A1* | 5/2011 | Shatsky | H04L 65/1016 370/352 |
| 2011/0173434 A1* | 7/2011 | Buckley | H04L 65/1016 713/150 |
| 2011/0249658 A1* | 10/2011 | Wohlert | H04W 4/04 370/338 |
| 2011/0250895 A1* | 10/2011 | Wohlert | H04W 4/16 455/445 |
| 2012/0020252 A1 | 1/2012 | Bouthemy | |
| 2012/0041856 A1 | 2/2012 | Narkar | |
| 2012/0117260 A1* | 5/2012 | Ropelewski | H04L 43/028 709/230 |
| 2012/0124156 A1* | 5/2012 | Esteban Vares | H04L 67/24 709/206 |
| 2012/0233298 A1* | 9/2012 | Verbandt | H04L 29/12188 709/220 |
| 2012/0263171 A1* | 10/2012 | Long | H04W 4/14 370/352 |
| 2012/0263174 A1* | 10/2012 | Mitchell | H04L 12/66 370/352 |
| 2012/0327847 A1* | 12/2012 | Rundquist | H04B 7/18582 370/316 |
| 2012/0327947 A1* | 12/2012 | Cai | H04W 8/18 370/410 |
| 2012/0329487 A1* | 12/2012 | Kowalewski | H04L 69/08 455/466 |
| 2013/0021998 A1* | 1/2013 | Shatsky | H04W 52/0209 370/329 |
| 2014/0206403 A1* | 7/2014 | Buckley | H04W 4/14 455/466 |
| 2015/0271659 A1* | 9/2015 | Ma | H04W 4/14 370/259 |
| 2016/0057607 A1* | 2/2016 | Dubesset | H04W 8/12 455/433 |
| 2016/0182675 A1* | 6/2016 | Rabbani | H04L 65/1016 709/223 |
| 2016/0198335 A1 | 7/2016 | Mannepally | |
| 2016/0226922 A1* | 8/2016 | Russell | H04L 65/1016 |
| 2016/0249401 A1* | 8/2016 | Tanaka | H04M 3/00 |
| 2017/0064487 A1* | 3/2017 | Buckley | H04W 4/70 |

OTHER PUBLICATIONS

3GPP TS 23.090 v13.0.0 Technical Specification, ETSI 123 090 v13.0.0, Jan. 2016, 24 pages.

3GPP TS 24 390 v13.2.0 Technical Specification, ETSI TS 124 3090 V13.2.0, Oct. 2016, 45 pages.

T-Mobile, "Self-service short codes", Mar. 1, 2012, retrieved on Apr. 17, 2017, at https://support.t-mobile.com/docs/DOC-4041, 3 pages.

Wikipedia, Diameter (protocol), retrieved on Apr. 17, 2017 at https://en.wikipedia.org/wiki/Diameter_(protocol), 14 pages.

Wikipedia, "Unstructured Supplementary Service Data", retrieved on Apr. 17, 2017 at https://en.wikipedia.org/wiki/Unstructured_Supplementary_Service_Data, 7 pages.

Wikipedia, "USSD Gateway", retrieved on Apr. 17, 2017 at https://en.wikipedia.org/wiki/USSD_Gateway, pages.

PCT Search Report and Written Opinion dated Oct. 25, 2017 for PCT Application No. PCT/US17/43801, 10 pages.

3GPP Standard, "Generation Partnership Project; Technical Specification Group Core Network and Terminals; Unstructured Supplementary Service Data (USSD) using IP Multimedia (IM) Core Network (CN) subsystem IMS; Stage 3 (Release 11 )", 3GPP TS 24.390, 3rd Generation Partnership Project (3GPP), Mobile Competence Centre, vol. CT WG1, No. V11.7.0, Jun. 24, 2016, retrieved on Jun. 24, 2016, pp. 1-25.

The Extended European Search Report dated Nov. 8, 2019, for European Application No. 17837408.8, 11 pages.

* cited by examiner

IP-BASED USSD COMMUNICATIONS

CROSS-REFERENCE TO RELATED APPLICATION

This application claims priority to a co-pending, commonly owned U.S. Provisional Patent Application No. 62/371,692 filed on Aug. 5, 2016, and titled "IMS Core-Sh-Interface Based USSD Design," which is herein incorporated by reference in its entirety.

BACKGROUND

Many cellular communication networks use USSD (Unstructured Supplementary Service Data) to convey proprietary data and messages between handsets and network servers. Although USSD can be used for any purpose, it is often used to implement what are known as service codes, also referred to as feature codes, quick codes, or short codes. A service code is a textual code that can be entered into a handset by a user to provide information or instructions to a service provider and to receive responsive information. For example, a user may enter the code #bal# to see the amount of unused minutes in the user's account. When the user enters the service code, the code is sent to the service provider in a USSD message. The service provider looks up the information corresponding to the code and returns the information to the handset in a responsive USSD message. The handset displays the information to the user.

A user can also modify settings and configurations using service codes. As one example, a service code may allow a user to turn call forwarding on and off USSD can also be used other services, such as callback services, money exchange services, location-based information services, service configuration, and so forth. Because USSD messages are not standardized, a given provider can use USSD for any desired purpose.

USSD services were originally used in older, circuit-switched networks, using SS7 (Signaling System 7) communication channels and protocols. However, service providers are gradually converting their networks to use IMS (IP Multimedia Subsystem) services and IP-based communications. Communications in these systems are often based on SIP (Session Initiation Protocol) and Diameter communication protocols rather than the previously used SS7 protocols.

Newer architectures typically provide flexibility by enabling service providers to deploy new IP-based technologies while keeping costs in line by leveraging existing services and signaling protocols. USSD is one example of this, where USSD messages can be handled in certain updated systems using SS7 communication protocols. However, a goal of many service providers is to eventually eliminate use of most or all such older protocols within their networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are interfaces, techniques, and systems that may be used within telecommunication networks to implement or access USSD (Unstructured Supplementary Service Data) services using IMS (IP Multimedia Subsystem) services and IP (Internet Protocol) network communications. In accordance with techniques that are described in more detail below, an MS (mobile station), such as a cellular handset, communicates using SIP (Session Initiation Protocol) with an IMS of a cellular telecommunication network or other communication network. More specifically, the MS sends a SIP INVITE message that is routed to a TAS (Telephony Application Server) associated with the IMS, where the SIP INVITE message contains a USSD message such as a feature code.

In response to receiving a SIP INVITE message of this type, the TAS sends a request to an HSS (Home Subscriber Server) of the IMS, where the request contains the USSD message. This request is sent to the HSS using the existing Diameter Sh communication interface between the TAS and the HSS. In response to receiving the request from the TAS, the HSS forwards the request to a USSD gateway, in some cases using another Diameter Sh interface that has been established between the HSS and the USSD gateway.

The USSD gateway interacts with an appropriate AS (Application Server) to determine a text string that is responsive to the received USSD message. The USSD gateway then sends an answer back to the HSS. The answer contains a USSD response and is sent to the HSS using the Diameter Sh interface between the USSD gateway and the HSS.

Upon receiving the answer, the HSS forwards the answer to the TAS, using the existing Sh communication interface between the HSS and the TAS. The TAS extracts the USSD response from the answer and sends a SIP BYE message back to the MS, where the BYE message contains the USSD response. Upon receiving the BYE message, the MS extracts the USSD response and displays it to the user.

Accessing USSD services in this manner may help with provider efforts to reduce the use of older SS7 or other legacy, non-IP-based interfaces and protocols. In the case of SS7 signaling, the described techniques may in some cases allow a provider to remove physical infrastructure that supports such legacy interfaces and protocols. In many cases this can be accomplished within existing architectures, because the Diameter Sh interface already exists in 4G systems between the TAS and the HSS. Furthermore, the described techniques may allow more features and flexibility than legacy SS7-based techniques, such as allowing USSD servers to initiate data transfers to phones.

Figure 1:
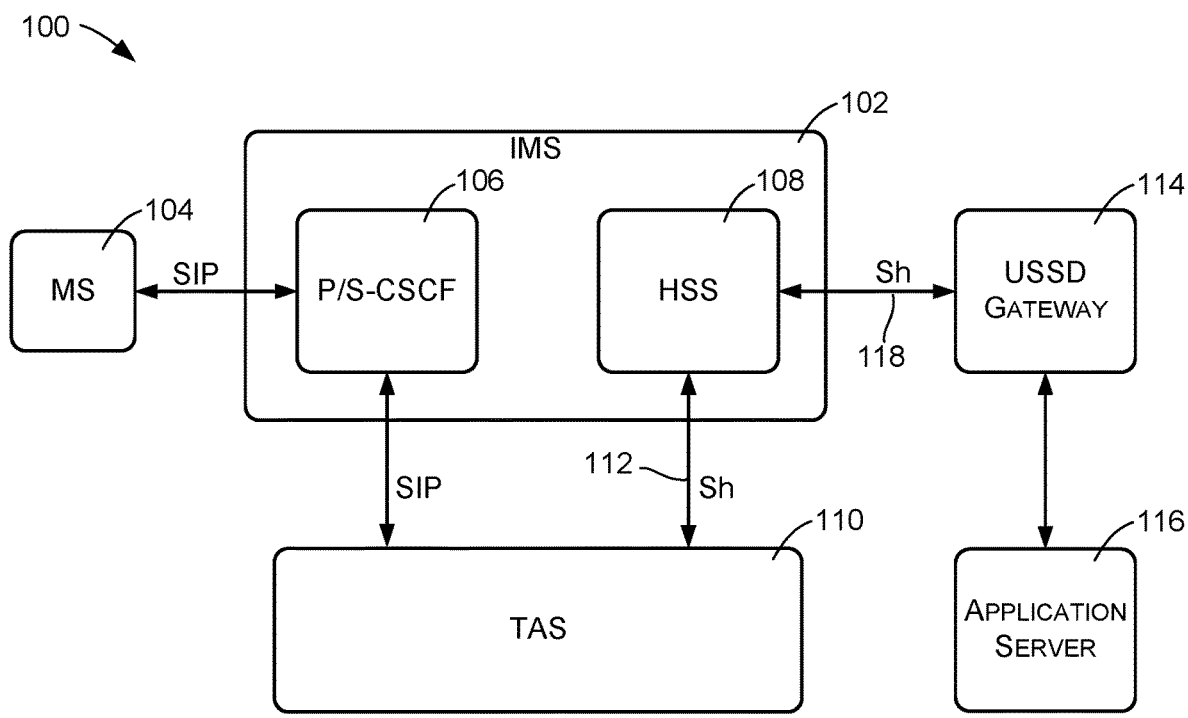
FIG. 1 is a block of a telecommunications system that supports IP-based USSD messaging.

FIG. 1 shows a portion of a mobile communication system 100 in which the described techniques may be implemented. In certain implementations, the mobile communication system 100 may comprise a cellular communication system.

In the described embodiment, the system 100 supports 4G (4th Generation) IP-based technologies and communication protocols. Among other components not shown, the system 100 has an IMS (IP Multimedia Subsystem) 102 that provides multimedia services to multiple MS's (mobile station) 104, only one of which is shown in FIG. 1 for purposes of illustration and discussion.

Components of the IMS 102 most relevant to the current discussion are shown in FIG. 1. In practice, the IMS 102 will have various other components and functions as defined by various standards and sub-standards. In the described embodiment, the IMS 102 may be implemented largely in accordance with 3GPP standards and specifications, such as 3GPP TS 23.228.

The MS 104 may comprise a device having network communication capabilities such as a mobile computing or other communication device. The communication capabilities of the MS 104 may include Wi-Fi capabilities, cellular or other telephony capabilities, and/or other wired or wireless network communication capabilities. The MS 104 communicates with the IMS 102 through a wireless access network (not shown), which is also referred to as an air interface or radio access network (RAN).

The MS 104 may be implemented as any suitable mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile device. It is also to be appreciated that the MS 104 may represent various types of communication devices that are generally stationary as well, such as televisions, desktop computers, game consoles, set top boxes, and the like. In this sense, the terms "communication device," "wireless device," "wireline device," "mobile device," "computing device," "user equipment," "UE," "MS," and "terminal" may be used interchangeably herein to describe any communication or computing device capable of performing techniques described herein as being performed by the MS 104.

Relevant components of the IMS 102 include a P/S-CSCF 106 (Proxy/Serving Call Session Control Function), which represents a combination of a P-CSCF (Proxy Call Session Control Function) and an S-CSCF (Serving Call Session Control Function). SIP (Session Initiation Protocol) messaging generally flows through the P/S-CSCF 106. In implementation, the IMS 102 may include multiple P-CSCFs and S-CSCFs, and may also include one or more I-CSCFs (Interrogating Call Session Control Functions). Functions or actions attributed herein to the P/S-CSCF 106 may be performed in practice by a P-CSCF or an S-CSCF of the IMS 102, or by a P-CSCF and S-CSCF in cooperation with each other.

The IMS 102 also has an HSS (Home Subscriber Service) 108, which is a central repository for subscriber information such as service profiles, preferences, terms of service, QoS commitments, and so forth. The HSS 108 is generally responsible for authentication, for mobility management, for application services, for determining which types of services are available for each subscriber, etc.

The system 100 has a TAS (Telephone Application Server) 110, which is an example of various different types of application servers that may be supported by the IMS 102. The TAS 110 provides services and functionality to support voice calls, and may also support communications using other types of media such as video, text, file transfer, media sharing, etc. In some environments, the TAS 110 may be referred to as an MMTel (Multimedia Telephony Service).

The MS 104 communicates with the IMS 102 and with the TAS 110 using the SIP communication protocol over an access network, which may include a radio access network. As noted above, SIP communications generally flow through the P/S-CSCF 106 of the IMS 102.

Figure 9:
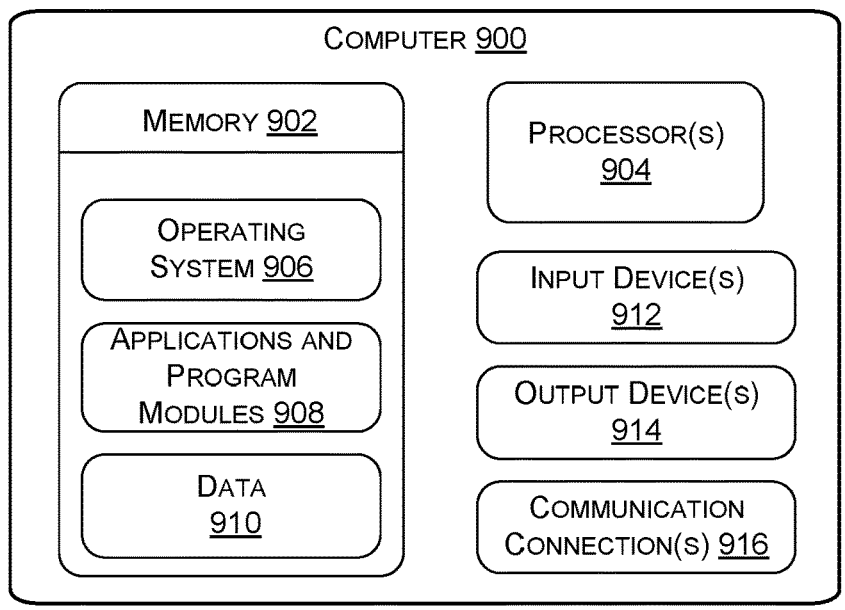
FIG. 9 is a block diagram of an example computing device that may be configured to implement various functional components of a communications network.

The various components associated with the IMS 102, such as the P/S-CSCF 106, the HSS 108, and the TAS 110, typically comprise respective computer servers, an example of which is shown in FIG. 9. Each such computer server may have a network communications adapter or interface (not shown in FIG. 1) such as an Ethernet interface or adapter, which is used for data communications over a local-area or wide-area network using IP communication protocols. Communications between the P/S-CSCF 106, the HSS 108, and the TAS 110 may be performed over such a local-area or wide-area network using the respective network communications interfaces and using IP-based communication protocols.

The TAS 110 may communicate with the HSS 108 at various times in order to determine service parameters that are applicable to any given communication session. The TAS 110 and the HSS 108 communicate with each other using a Diameter Sh interface 112, which is a logical IP-based interface that uses the Sh transport protocol. The Sh protocol is defined by 3GPP TS 29.328 and 3GPP TS 29.329, and is based on the Diameter base protocol as defined by IETF RFC 3588.

The Sh protocol defines four types of messages, which enable the TAS 110 to access and maintain subscriber information that is stored by the HSS 108. The four message types are: UDR/A (User Data Request/Answer) for obtaining subscriber information from the HSS; PUR/A (Profile Update Request/Answer) for updating subscriber data in the HSS; SNR/A (Subscribe Notifications Request/Answer) for subscribing to notifications from the HSS; and PNR/A (Push Notification Request/Answer) that allows the HSS to notify the TAS of changes in subscriber data.

The system 100 also has a USSD (Unstructured Supplementary Service Data) service or gateway 114, which in combination with one or more application servers 116 provides or supports USSD services within the system 100. The USSD gateway 114 is configured to receive USSD messages and in response to return USSD responses. The USSD gateway 114 and/or the application server 116 may communicate with various other components of the system 100 in order to obtain information that is responsive to USSD message and to otherwise respond to instructions that are conveyed to the USSD gateway 114 as USSD messages.

In some embodiments, a second IP-based Diameter Sh interface 118 may be used for communications between the HSS 108 and the USSD gateway 114. In other embodiments, the HSS 108 and the USSD gateway 114 may communicate with each other using an SS7 (Signaling System No. 7) interface, and more specifically using a MAP (Mobile Application Part) interface that is based on SS7.

The USSD gateway 114 and server 116 may support the use of service codes within the system 100. As described above, a user enters a service code into the MS 104. The service code corresponds to a request for information, a request to change a service parameter, a request to change subscriber information, etc. The service code is sent to the IMS 100 as a USSD message. The USSD gateway 114, upon receiving the service code, returns the requested information as a USSD response and/or performs the requested function.

Figure 2:
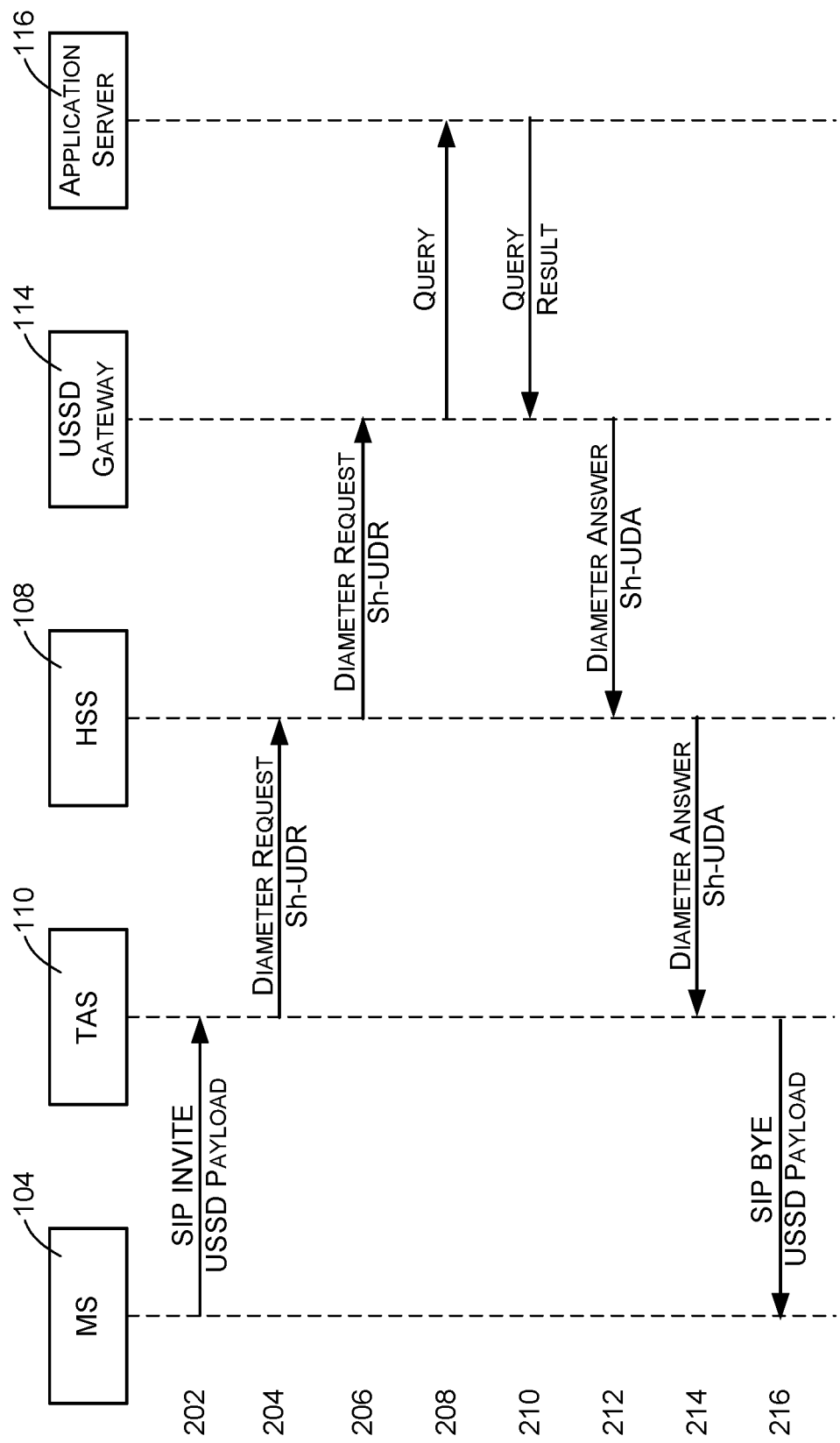
FIG. 2 is a communication sequence diagram illustrating an example communication sequence for communicating USSD messages and responses.

FIG. 2 shows an example of communications between the MS 104 and the USSD gateway 114, such as may be implemented in the system 100 of FIG. 1. More specifically, FIG. 2 shows a high-level call flow that may be implemented in certain embodiments for communicating USSD messages from the MS 104 to a USSD gateway or service 114, and for communicating USSD responses from the USSD gateway 114 to the MS 104.

Figure 3:
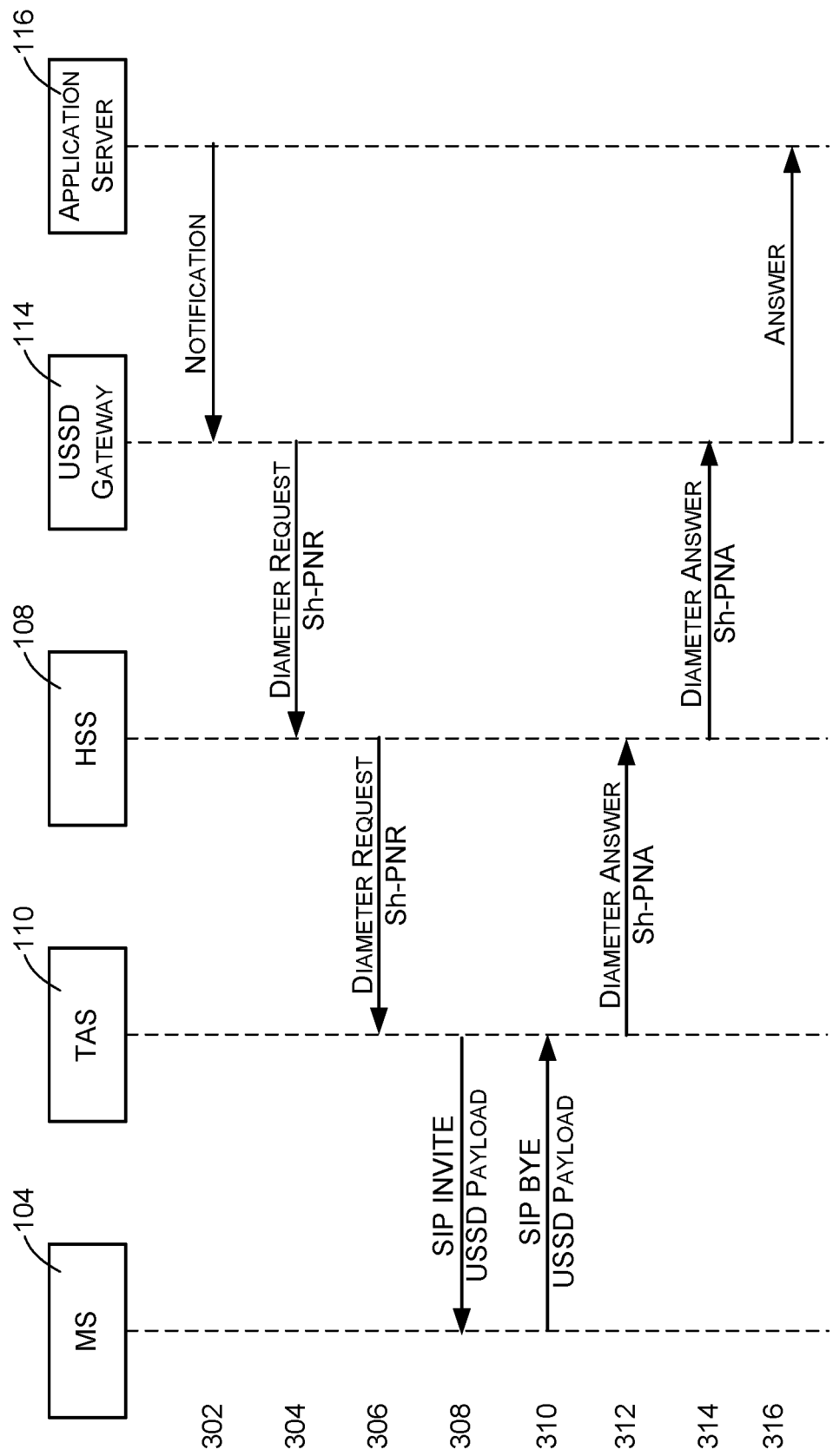
FIG. 3 is a communication sequence diagram illustrating another example communication sequence for communicating USSD messages and responses.

In FIG. 2, as well as in FIG. 3 described below, communicating components or entities are listed along the top, with a corresponding vertical line extending downward. Communications are indicated by arrows that extend from and to the vertical lines corresponding to the entities from which the communications originate and terminate, respectively. Communications occur in order from top to bottom. An individual communication or set of communications is indicated by a corresponding reference numeral along the left side of the figure, horizontally aligned with the arrow or arrows representing the communication. Note that FIGS. 2 and 3 illustrate the most relevant communications and may omit other communications that occur in practice but are less relevant to the topic at hand. Such other communications may include communications that both precede and follow the illustrated communications, communications that occur in time between the illustrated communications, and communications that occur between components or entities that are not specifically shown.

At 202, the MS 104 sends a USSD message to the IMS 102, and more specifically to the TAS 110 of the IMS 102. The USSD message may comprise a text string, referred to herein as USSD request text, which may in some cases correspond to a service code.

In the described embodiment, the USSD message is conveyed by way of a SIP INVITE request from the MS 104 to the IMS 102. Within the IMS 102, the SIP INVITE request is received and routed by various components, including the P/S-CSCF 106 (not shown in FIG. 2), to the TAS 110. The SIP INVITE request is formatted in accordance with 3GPP TS 24.390, so that the SIP URI of the SIP INVITE has a user part that includes the USSD message, a phone-context parameter in accordance with 3GPP TS 24.229, a host part set to the home network domain name used in a previous REGISTER request, and a "user" URI parameter set to the value "dialstring". The Recv-Info header field contains the g.3gpp.ussd info-package name, and the Accept header field contains the application/vnd.3gpp.ussd+xml, application/sdp, and multipart/mixed MIME types.

At 204, the TAS 110 sends a UDR (User Data Request) message to the HSS 108 over the Sh interface 112. In the described embodiment, the UDR message is formatted in accordance with the Diameter Sh protocol specification as set forth in 3GPP TS 29.329. The UDR message contains the USSD request text.

In order to identify the UDR message as a request containing a USSD message, the UDR message specifies a Data-Reference AVP (Attribute-Value Pair) that has been selected to uniquely correspond to Sh-based USSD messages. The selected Data-Reference AVP may comprise any Data-Reference AVP that is not otherwise specified or reserved for use within Sh messages by applicable standards and specifications such as the 3GPP TS 29.329 specification.

The USSD request text itself is specified within the Sh-UDR message in the User Data field, with an XML data type "tUSSD."

At 206, the HSS 108 forwards the UDR message to the USSD gateway 114 using the Sh interface 118, again using the selected Data-Reference AVP, with the USSD text in the User Data field. At 208, the USSD gateway 114 responds by querying an appropriate application server 116 or other components of the system 100 to retrieve data that is responsive to the received USSD request text. At 210, the USSD gateway 114 receives this responsive data. Interactions between the USSD gateway 114 and other components such as the application server 116 may use any appropriate or available communication protocols, such as MAP (Mobile Application Part), SOAP (Simple Object Access Protocol), LDAP (Lightweight Directory Access Protocol), etc.

At 212, the USSD gateway 114 composes a UDA (User Data Answer) message and sends it to the HSS 108 over the Sh interface 118. The UDA specifies the same selected Data-Reference AVP as was used in the UDR. The UDA contains a USSD response that is based on the USSD request text received by the USSD gateway from the application server 116. The USSD response may comprise a text string, which is referred to herein as USSD response text. The User Data field of the UDA message contains the response text.

At 214, the HSS 108 forwards the UDA message to the TAS 110 using the Sh interface 112. The UDA message as forwarded to the TAS 110 has the same selected Data-Reference AVP as used in previous Sh communications described above. The response text is specified in the User Data field of the UDA message sent to the TAS 110.

The TAS 110 receives the UDA message, extracts the response text, and at 216 responds to the earlier SIP INVITE message by sending a SIP BYE message to the MS 104. The SIP BYE message contains the response string as a payload. The SIP BYE message may be formatted in accordance with 3GPP TS 23.228, 24.229, 24.390, and 23.090, where the payload of the BYE message comprises the USSD response text. The BYE message specifies the application/vnd.3gpp.ussd+xml MIME body, including a <language> element and <ussd-string> element that contains the USSD response text.

The MS 104, upon receiving the SIP BYE message, extracts and displays the USSD response text specified by the BYE message.

Although FIG. 2 illustrates communications using a UDR and UDA messages, other Sh message types may be used in place of the UDR and UDA messages. For example, PUR and PUA messages may be used in place of the UDR and UDA messages in the call flow of FIG. 2. USSD data can be embedded in a PUR or PUA message in the same way as described above for UDR and UDA messages. The selected AVP can be used to identify the PUR and PUA messages as conveying USSD messages and responses.

Similarly, the call flow of FIG. 2 can be used to allow the MS 104 to subscribe to notifications from the USSD gateway 114, by substituting an SNR message for the UDR message and an SNA for the UDA message, and otherwise using the same communication protocols. When an MS 104 has submitted an SNR message and received an SNA message in response, the USSD gateway may send USSD notifications to the MS 104, even without receiving a USSD request from the MS 104.

FIG. 3 shows another example of communications between the USSD gateway 114 and the MS 104. Specifically, FIG. 3 shows a high-level call flow that may be initiated by the USSD gateway 114 and/or the application server 116, for communicating USSD messages to the MS 104. For example, the call flow of FIG. 3 may be used when sending a notification from the USSD gateway 114 to the MS 104, without having previously received a USSD request from the MS 104.

At 302, the application server 116 sends a notification to the USSD gateway 114 using a communication protocol such as MAP, SOAP, LDAP, etc. The notification specifies a USSD text string that is to be provided to the MS 104, which is referred to herein as the USSD request text.

At 304, the USSD gateway 114 receives the notification from the application server 116, composes a PNR (Push Notification Request) message, and sends the PNR message to the HSS 108 over the Sh interface 118. In the described embodiment, the PNR message is formatted in accordance with the Diameter Sh protocol specification as set forth in 3GPP TS 29.329 and as described above. The PNR message contains the USSD request text.

In order to identify the PNR message as a request containing a USSD message, the PNR message specifies a Data-Reference AVP as described above, which has been selected to uniquely correspond to Sh-based USSD messages.

In certain embodiments, the USSD request text is specified within the Sh-PNR message in the User Data field, with an XML data type "tUSSD."

At 306, the HSS 108 forwards the PNR message to the TAS 110 over the Sh interface 112, again using the selected Data-Reference AVP, with the USSD request text in the User Data field.

At 308, in response to receiving PNR message, the TAS sends a SIP INVITE request to the MS 104. The SIP INVITE request is formatted in accordance with 3GPP TS 24.390 as already described, so that the SIP URI of the SIP INVITE has a user part that includes the USSD message, a phone-context parameter in accordance with 3GPP TS 24.229, a host part set to the home network domain name used in a previous REGISTER request, and a "user" URI parameter set to the value "dialstring". The Recv-Info header field contains the g.3gpp.ussd info-package name, and the Accept header field contains the application/vnd.3gpp.ussd+xml, application/sdp, and multipart/mixed MIME types.

At 310, upon receiving the SIP INVITE request the MS 104 may send a SIP BYE message to the TAS 110, indicating that the MS 104 has received the USSD data. The SIP BYE message may be formatted in accordance with 3GPP TS 23.228, 24.229, 24.490, and 23.090. The BYE message specifies the application/vnd.3gpp.ussd+xml MIME body, including a <language> element and <ussd-string> element that contains the USSD response text.

At 312, the TAS 110 composes and sends a PNA (Push Notification Answer) message to the HSS 108 over the Sh interface 112. In the described embodiment, the PNA message is formatted in accordance with the Diameter Sh protocol specification as set forth in 3GPP TS 29.329. The PNA message is identified as a USSD message by specifying the Data-Reference AVP that has been selected to uniquely correspond to Sh-based USSD messages.

At 314, the HSS 108 forwards the PNA message to the USSD gateway 114 using the Sh interface 118, again using the selected Data-Reference AVP. At 316, the USSD gateway 114 forwards an answer to the application server 116, indicating that the notification was received by the MS 104.

Figure 4:
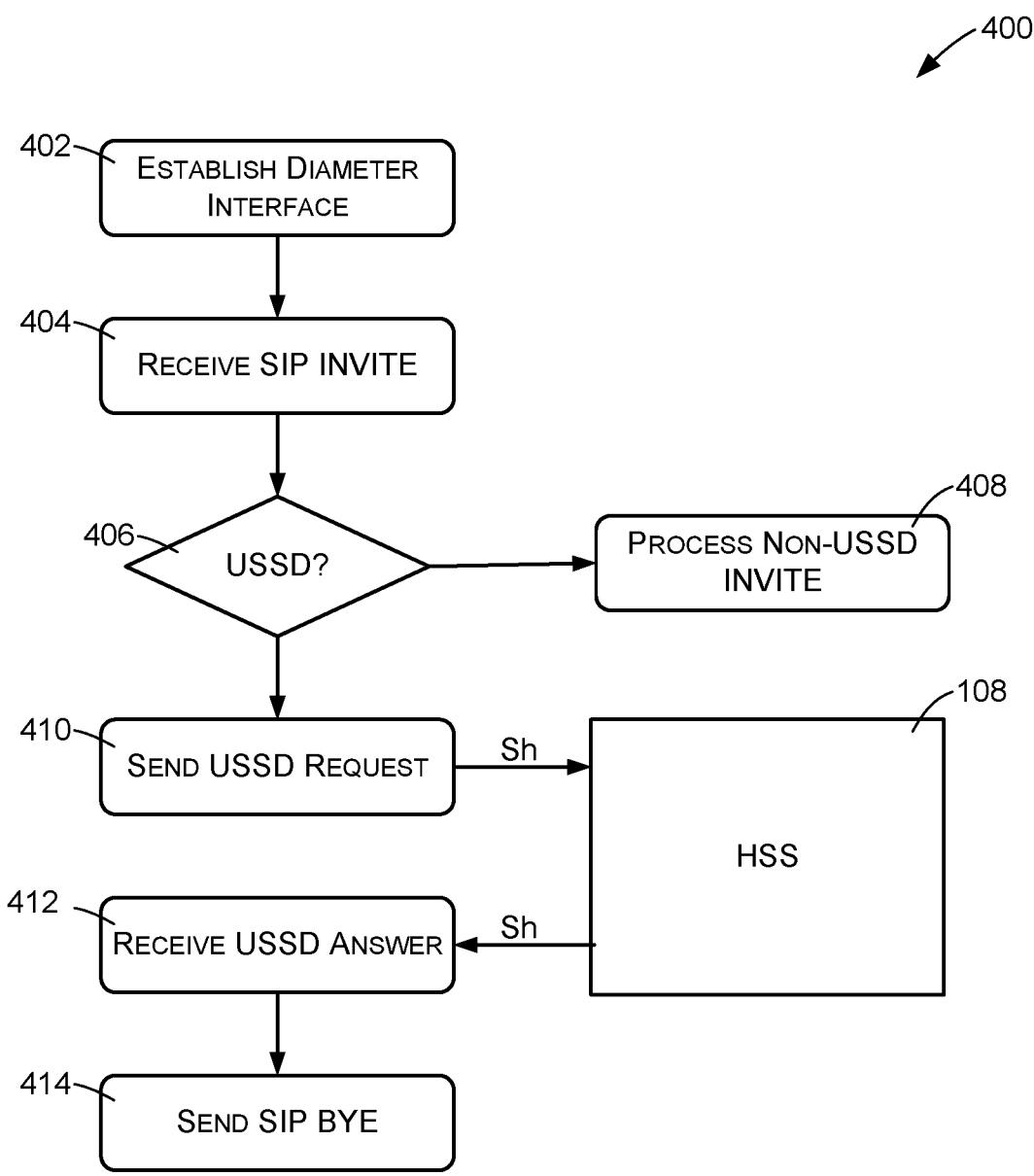
FIG. 4 is a flow diagram illustrating an example method for communicating USSD messages and responses.

FIG. 4 illustrates an example method 400 for communicating USSD messages and responses between an MS and an HSS, as part of communications between the MS and a USSD service such as a USSD gateway. Although the method 400 will be described in the context of the system 100 of FIG. 1, the method 400 can also be performed in other environments. In the environment of FIG. 1, the actions shown in FIG. 4 may be performed by the TAS 110.

An action 402 comprises establishing a logical communication interface with the HSS 108 of the IMS 102. The logical communication interface may be established via IP-based network communication interfaces or adapters of the HSS 108 and the TAS 110. In the described embodiment, the logical communication interface comprises the Diameter Sh interface 112 as shown in FIG. 1. Communications between the HSS 108 and the TAS 110 are conducted over the Sh interface 112 in accordance with the Diameter Sh communication protocol.

An action 404 comprises receiving a SIP INVITE message via the IP-based network communication interface or adapter of the TAS 110, formatted as describe above with reference to FIG. 2. The SIP INVITE message specifies the USSD text as payload.

An action 406 comprises determining whether the SIP INVITE message contains a USSD message or payload, such as by determining whether the Request-URI of the SIP INVITE message contains the SIP URI and a "user" URI parameter set to the value "dialstring." If the SIP INVITE message does not contain a USSD message or payload, further actions are performed in accordance with existing protocols to process non-US SD messages, as indicated by the block 408.

If the SIP INVITE message does contain a USSD message or payload, an action 410 is performed of sending a USSD request to the HSS 108, wherein the request contains the USSD message or payload. As described herein, the USSD request may be communicated using the Diameter Sh interface 112, and is therefore formatted in accordance with the Diameter Sh protocol. The request may comprise an Sh UDR message in some embodiments, and the UDR message may be identified as a USSD request by specifying a predetermined Data-Reference AVP in the request. The UDR message contains or specifies the USSD message specified by the previous SIP INVITE message.

An action 412 comprises receiving a USSD response from the HSS 108, wherein the response contains USSD response text. As described herein, the USSD response may be communicated using the Diameter Sh interface 112, and is therefore formatted in accordance with the Diameter Sh protocol. The USSD response may comprise an Sh UDA message in some embodiments, and the UDA message may be identified as a USSD response by having the predetermined Data-Reference AVP.

An action 414 comprises sending a SIP BYE message to the MS 104, wherein the SIP BYE message contains USSD response text.

Figure 5:
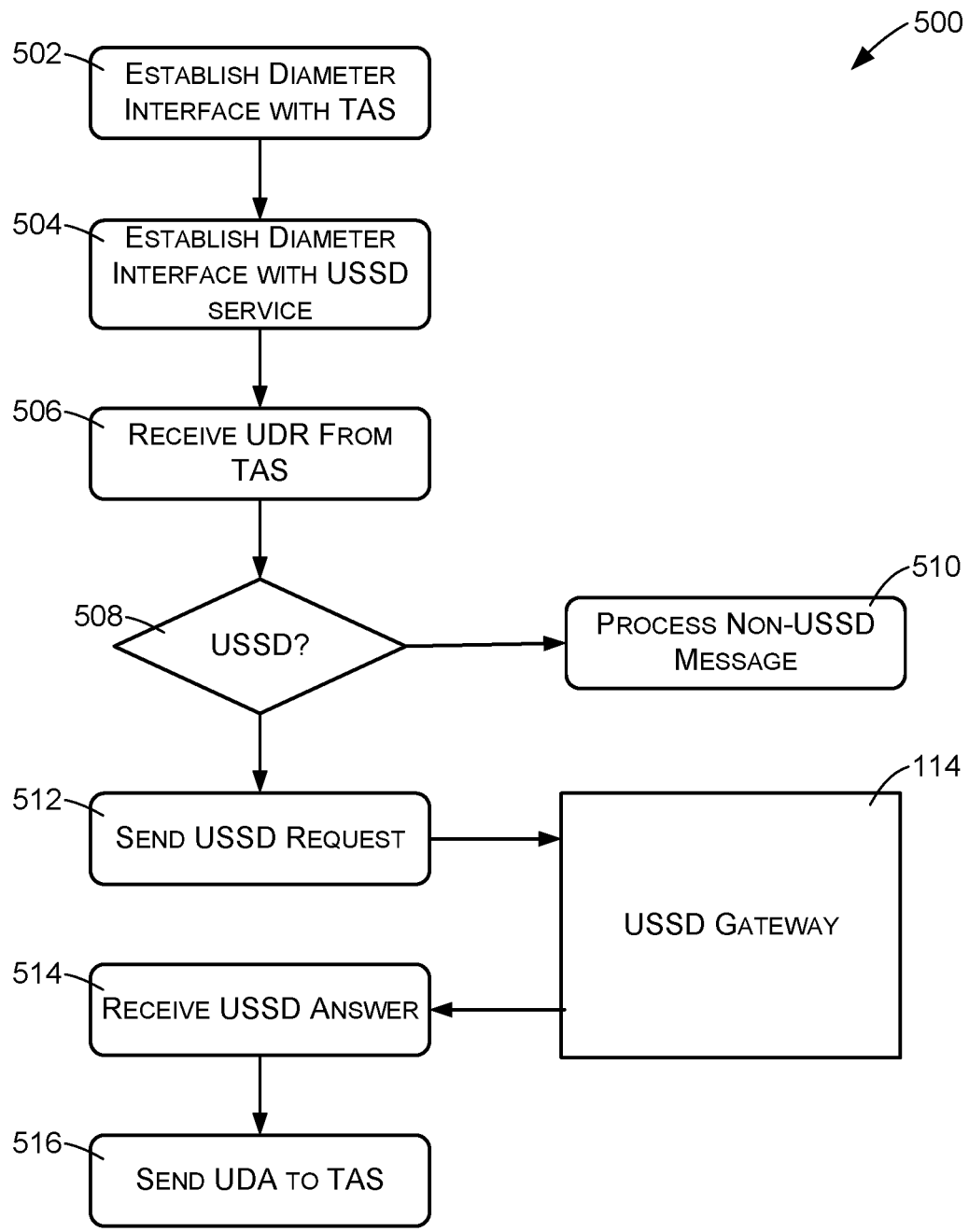
FIG. 5 is a flow diagram illustrating another example method for communicating USSD messages and responses.

FIG. 5 illustrates an example method 500 for communicating USSD data between a TAS and a USSD gateway or other USSD service. The actions shown in FIG. 5 may be performed by the HSS 108 of FIG. 1 as part of communications between the MS 104 and the USSD gateway 114. Although the method 500 will be described in the context of the system 100 of FIG. 1, the method 500 can also be performed in other environments.

An action 502 comprises establishing a logical communication interface with the TAS 110 of the IMS 102. In the described embodiment, the logical communication interface comprises the Diameter Sh interface 112 as shown in FIG. 1. Communications between the HSS 108 and the TAS 110 are conducted over the Sh interface 112 in accordance with the Diameter Sh communication protocol, using IP-based network communication adapters of the HSS 108 and the TAS 110.

An action 504 comprises establishing a logical communication interface between the HSS 108 and the USSD gateway 114. In the described embodiment, the logical communication interface comprises the Diameter Sh interface 118 as shown in FIG. 1. Communications between the HSS 108 and the USSD gateway 114 are conducted over the Sh interface 118 in accordance with the Diameter Sh communication protocol, using IP-based network communication interfaces of the HSS 108 and the USSD gateway 114.

An action 506 comprises receiving a USSD message from the TAS 110. As described herein, the USSD message may be communicated using the Diameter Sh interface 112, and is therefore formatted in accordance with the Diameter Sh protocol. The USSD message may comprise an Sh UDR message in some embodiments, and the UDR message may be identified as a USSD message by specifying the predetermined Data-Reference AVP in the UDR message.

An action 508 comprises determining whether the received UDR message contains a USSD message or payload, such as by determining whether the UDR message specifies the predetermined Data-Reference AVP. If the received UDR message does not specify the predetermined Data-Reference AVP, further actions are performed in accordance with existing protocols to process a non-USSD UDR message, as indicated by the block 510.

An action 512 comprises sending the USSD message to the USSD gateway 114. In the described embodiment, this comprises sending a second Diameter Sh request to the USSD gateway 114, where the Sh request contains the USSD message or payload. As described herein, this request may be communicated using the Diameter Sh interface 118, and is therefore formatted in accordance with the Diameter Sh protocol. The request may comprise an Sh UDR message in some embodiments, and the UDR message may be identified as a USSD message by having the predetermined Data-Reference AVP.

An action 514 comprises receiving a USSD response from the USSD gateway 114. The response may be received as an Sh UDA message, using the Sh interface 118 and being formatted in accordance with the Sh communication protocol. The UDA message may contain the USSD response, which may comprise USSD response text.

An action 516 comprises sending the USSD response back to the TAS 110 over the Sh interface 112. The USSD response may be sent as an Sh UDA message, which is formatted in accordance with the Sh communication protocol.

Figure 6:
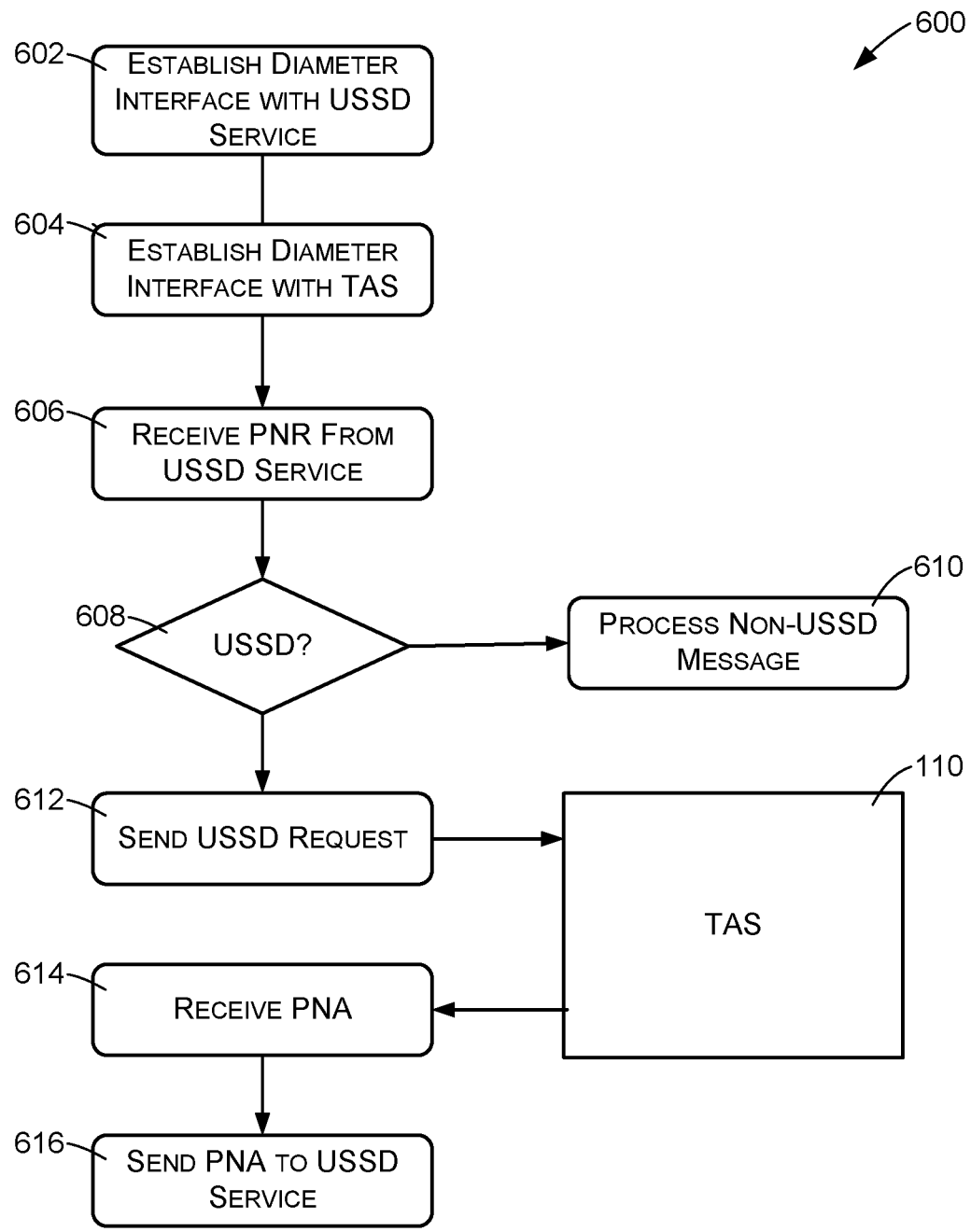
FIG. 6 is a flow diagram illustrating another example method for communicating USSD messages.

FIG. 6 illustrates an example method 600 for communicating USSD data between a USSD gateway and a TAS, in situations in which the application server 116 initiates communications in order to send USSD text to the MS 104. The actions shown in FIG. 6 may be performed by the HSS 108 of FIG. 1 as part of communications between the MS 104 and the USSD gateway 114. Although the method 600 will be described in the context of the system 100 of FIG. 1, the method 600 can also be performed in other environments.

An action 602 comprises establishing a logical communication interface between the HSS 108 and the USSD gateway 114. In the described embodiment, the logical communication interface comprises the Diameter Sh interface 118 as shown in FIG. 1. Communications between the HSS 108 and the USSD gateway 114 are conducted over the Sh interface 118 in accordance with the Diameter Sh communication protocol, using IP-based network communication interfaces of the HSS 108 and the USSD gateway 114.

An action 604 comprises establishing a logical communication interface with the TAS 110 of the IMS 102. In the described embodiment, the logical communication interface comprises the Diameter Sh interface 112 as shown in FIG. 1. Communications between the HSS 108 and the TAS 110 are conducted over the Sh interface 112 in accordance with the Diameter Sh communication protocol, using IP-based network communication adapters of the HSS 108 and the TAS 110.

An action 606 comprises receiving a USSD message from the USSD gateway 114. As described herein, the USSD message may be communicated using the Diameter Sh interface 118, and is therefore formatted in accordance with the Diameter Sh protocol. The USSD message may comprise an Sh PNR message in some embodiments, and the PNR message may be identified as a USSD message by specifying the predetermined Data-Reference AVP in the PNR message.

An action 608 comprises determining whether the received PNR message contains a USSD message or payload, such as by determining whether the PNR message specifies the predetermined Data-Reference AVP. If the received PNR message does not specify the predetermined Data-Reference AVP, further actions are performed in accordance with existing protocols to process a non-USSD PNR message, as indicated by the block 610.

An action 612 comprises sending the USSD message to the TAS 110. In the described embodiment, this comprises sending a second Diameter Sh request to the TAS 110, where the Sh request contains the USSD message or payload. As described herein, this request may be communicated using the Diameter Sh interface 112, and is therefore formatted in accordance with the Diameter Sh protocol. The request may comprise an Sh PNR message in some embodiments, and the PNR message may be identified as a USSD message by having the predetermined Data-Reference AVP.

An action 614 comprises receiving a USSD response from the TAS 110. The answer may be received as an Sh PNA message, using the Sh interface 112 and being formatted in accordance with the Sh communication protocol. The answer may contain a USSD response, which may comprise USSD response text.

An action 616 comprises sending the USSD response back to the USSD gateway 114 over the Sh interface 118. The USSD response may be sent as an Sh PNA message, which is formatted in accordance with the Sh communication protocol as described above.

Figure 7:
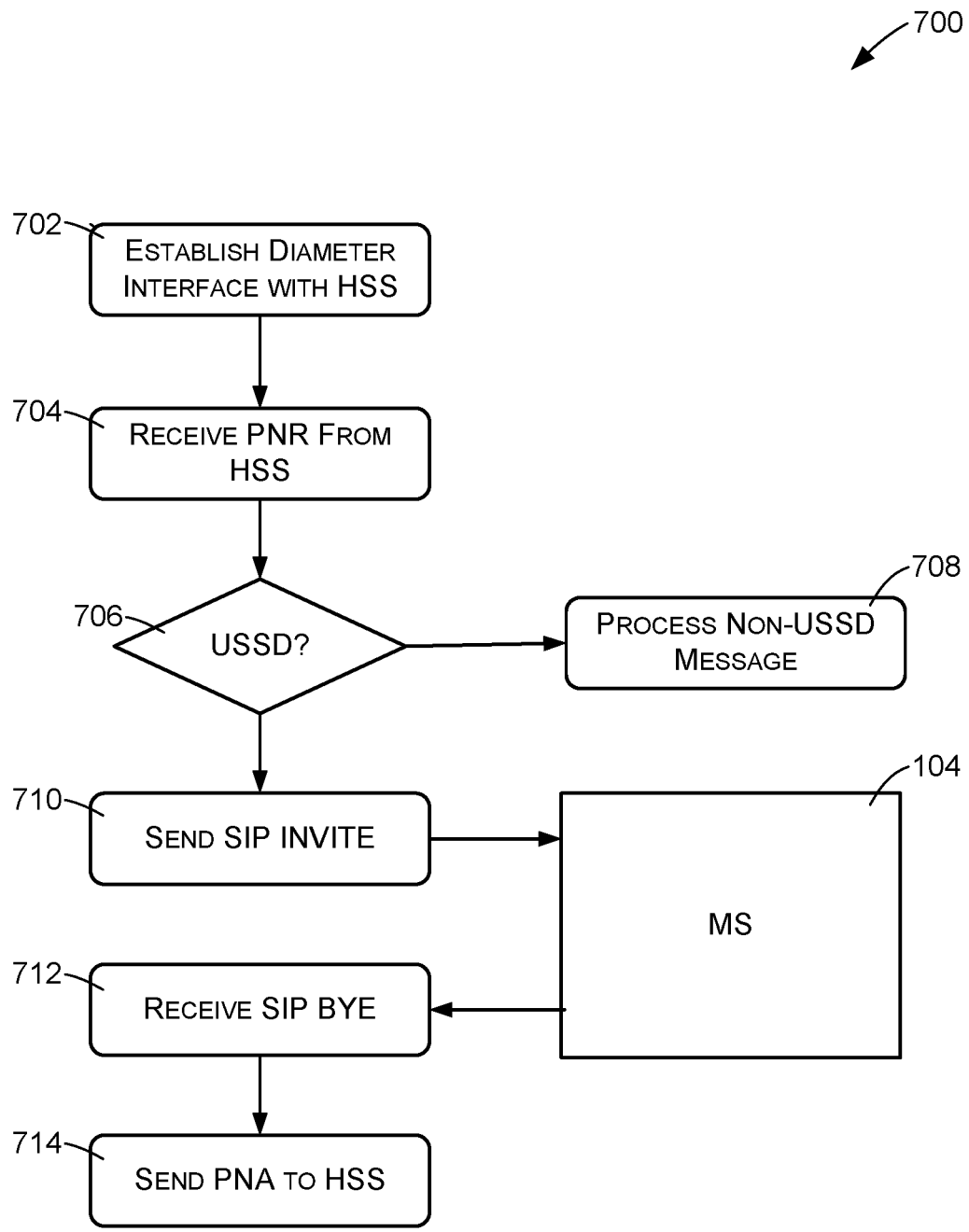
FIG. 7 is a flow diagram illustrating another example method for communicating USSD messages.

FIG. 7 illustrates an example method 700 for communicating USSD messages and responses between an HSS and an MS, as part of communications that are initiated by the application server 116 and/or the USSD gateway 114. Although the method 700 will be described in the context of the system 100 of FIG. 1, the method 700 can also be performed in other environments. In the environment of FIG. 1, the actions shown in FIG. 7 may be performed by the TAS 110.

An action 702 comprises establishing a logical communication interface with the HSS 108 of the IMS 102. The logical communication interface may be established via IP-based network communication interfaces or adapters of the HSS 108 and the TAS 110. In the described embodiment, the logical communication interface comprises the Diameter Sh interface 112 as shown in FIG. 1. Communications between the HSS 108 and the TAS 110 are conducted over the Sh interface 112 in accordance with the Diameter Sh communication protocol.

An action 704 comprises receiving a USSD message from the HSS 108. As described herein, the USSD message may be communicated using the Diameter Sh interface 112, and is therefore formatted in accordance with the Diameter Sh protocol. The USSD message may comprise an Sh PNR message in some embodiments.

An action 708 comprises determining whether the received PNR message contains a USSD message or payload, such as by determining whether the PNR message specifies the predetermined Data-Reference AVP. If the received PNR message does not specify the predetermined Data-Reference AVP, further actions are performed in accordance with existing protocols to process a non-USSD PNR message, as indicated by the block 708.

An action 710 comprises composing and sending a SIP INVITE message to the MS 104, via the IP-based network communication interface or adapter of the TAS 110, formatted as describe above with reference to FIG. 2. The SIP INVITE message specifies any USSD text that was in the payload of the PNR message.

An action 712 comprises receiving a SIP BYE message from the MS 104 in response to the SIP INVITE message.

An action 714 comprises, in response to receiving the SIP BYE message, sending a second Diameter Sh request to the HSS 108, indicating that the USSD message was received by the MS 104. As described herein, this request may be communicated using the Diameter Sh interface 112, and is therefore formatted in accordance with the Diameter Sh protocol. The request may comprise an Sh PNA message in some embodiments, and the PNA message may be identified as a USSD message by having the predetermined Data-Reference AVP.

Figure 8:
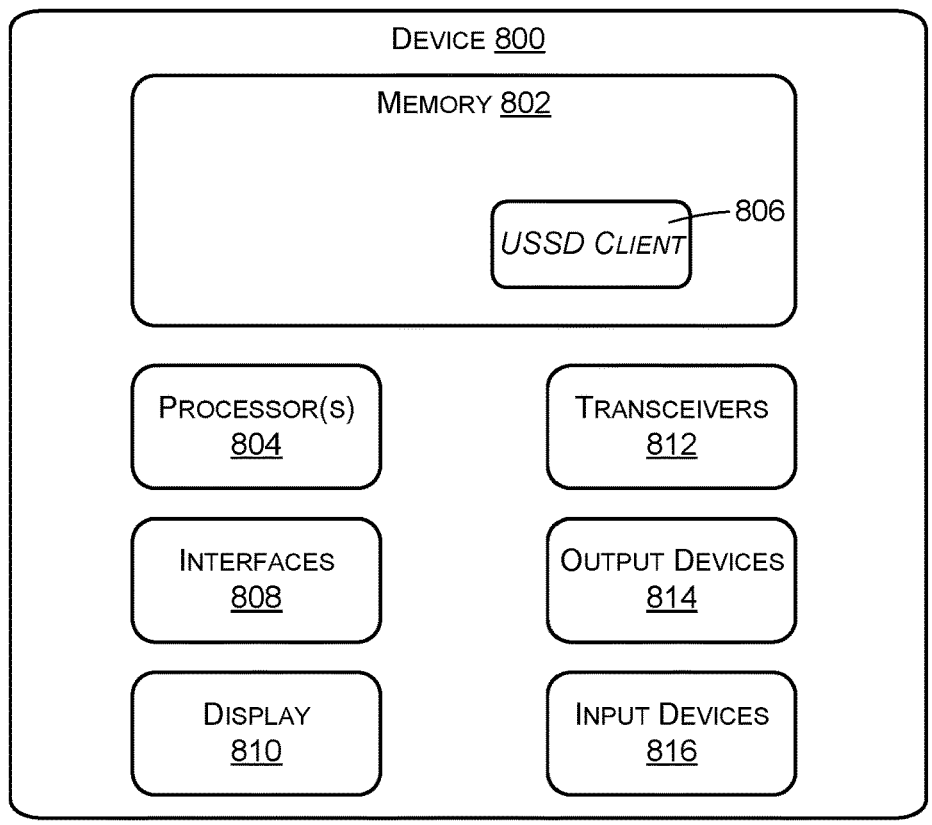
FIG. 8 is a block diagram of an example mobile communications device.

FIG. 8 illustrates an example mobile device 800 that may be used in conjunction with the techniques described herein. The device 800 is an example of an MS 104 as shown in FIG. 1.

The device 800 may include memory 802 and a processor 804. The memory 802 may include both volatile memory and non-volatile memory. The memory 802 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 802 may include a SIM (subscriber identity module), which is a removable smart card used to identify a user of the device 800 to a service provider network.

The memory 802 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 802 may in some cases include storage media used to transfer or distribute instructions, applications, and/or data. In some cases, the memory 802 may include data storage that is accessed remotely, such as network-attached storage that the device 800 accesses over some type of data communications network.

The memory 802 stores one or more sets of instructions (e.g., software) such as a computer-executable program that embodies operating logic for implementing and/or performing desired functionality of the device 800. The instructions may also reside at least partially within the processor 804 during execution thereof by the device 800. Generally, the instructions stored in the computer-readable storage media may include various applications that are executed by the processor 804, an operating system (OS) that is also executed by the processor 804, and associated data.

As an example, relevant to this discussion, a USSD client application 806 may be stored in the memory 802 for execution by the processor 804. The USSD client application 806 may be configured to send a USSD message within a SIP INVITE message, and to receive a USSD response that is embedded within a SIP BYE message, in accordance with the formats specified by 3GPP TS 24.490. The USSD client application 806 may also include functionality for interacting with a user of the device 800 in order to receive features codes and to display responses.

In some embodiments, the processor(s) 804 is a central processing unit (CPU), a graphics processing unit (GPU), both CPU and GPU, or other processing unit or component known in the art. Furthermore, the processor(s) 804 may include any number of processors and/or processing cores. The processor(s) 804 is configured to retrieve and execute instructions from the memory 802.

The device 800 may have interfaces 808, which may comprise any sort of interfaces known in the art. The interfaces 808 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 800 may have a display 810, which may comprise a liquid crystal display or any other type of display commonly used in telemobile devices or other portable devices. For example, the display 810 may be a touch-sensitive display screen, which may also act as an input device or keypad, such as for providing a soft-key keyboard, navigation buttons, or the like.

The device 800 may have transceivers 812, which may include any sort of transceivers known in the art. For example, the transceivers 812 may include radios and/or radio transceivers and interfaces that perform the function of transmitting and receiving radio frequency communications via an antenna, through a cellular communication network of a wireless data provider. The radio interfaces facilitate wireless connectivity between the device 800 and various cell towers, base stations and/or access points.

The device 800 may have output devices 814, which may include any sort of output devices known in the art, such as a display (already described as display 810), speakers, a vibrating mechanism, or a tactile feedback mechanism. The output devices 814 also include ports for one or more peripheral devices, such as headphones, peripheral speakers, or a peripheral display.

The device 800 may have input devices 816, which may include any sort of input devices known in the art. For example, the input devices 816 may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

FIG. 9 is a block diagram of an illustrative computer 900, which may be configured as a computer server to implement various component associated with the IMS 102, such as the P/S-CSCF 105, the HSS 108, the TAS 110, the USSD gateway 114, and the application server 116.

The computer 900 may include memory 902 and a processor(s) 904. The memory 902 may include both volatile memory and non-volatile memory. The memory 902 can also be described as non-transitory computer-readable storage media or machine-readable memory, and may include removable and non-removable media implemented in any method or technology for storage of information, such as computer executable instructions, data structures, program modules, or other data.

The memory 902 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 902 may in some cases include storage media used to transfer or distribute instructions, applications, and/or data. In some cases, the memory 902 may include data storage that is accessed remotely, such as network-attached storage that the computer 900 accesses over some type of data communications network.

The memory 902 stores one or more sets of instructions (e.g., software) such as a computer-executable program that embodies operating logic for implementing and/or performing any one or more of the methodologies or functions described herein. The instructions may also reside at least partially within the processor 904 during execution thereof by the computer 900.

Generally, the instructions stored in the memory 902 may include an operating system 906, various applications and program modules 908, and various types of data 910.

In some embodiments, the processor(s) 904 is a central processing unit (CPU), a graphics processing unit (GPU), both CPU and GPU, or other processing unit or component known in the art. Furthermore, the processor(s) 904 may include any number of processors and/or processing cores, and may include virtual processors, computers, or cores. The processor(s) 904 is configured to retrieve and execute instructions from the memory 902.

The computer 900 may also have input device(s) 912 such as a keyboard, a mouse, a touch-sensitive display, voice input device, etc. Output device(s) 914 such as a display, speakers, a printer, etc. may also be included. The computer 900 may also contain communication connections 916 that allow the device to communicate with other computing devices. For example, the communication connections 916 may include a network communication interface such as an Ethernet adapter, which is typically used to communicate using IP-based communication protocols with other computers 900 that implement various functionality associated with the IMS 102 of FIG. 1. The communication connections may also include other types of interfaces or adapters, such as Wi-Fi interfaces.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   establishing, by a Telephony Application Server (TAS), a first Diameter communication interface between a Home Subscriber Service (HSS) of an IP Multimedia Subsystem (IMS) and the TAS;
   receiving, by the TAS, a Session Initiation Protocol (SIP) INVITE message;
   determining, by the TAS, that a payload of the SIP INVITE message contains an Unstructured Supplementary Service Data (USSD) message, the USSD message comprising a text string;
   sending, by the TAS, a first Diameter request to the HSS via the first Diameter communication interface, wherein the first Diameter request contains the USSD message;
   receiving, by the TAS, a Diameter answer from the HSS via the first Diameter communication interface, wherein the Diameter answer contains a USSD response; and
   sending, by the TAS, a SIP BYE message that contains the USSD response.

2. The method of claim 1, further comprising specifying, by the TAS, a predetermined Data-Reference attribute-value pair (AVP) in the first Diameter request to indicate that the first Diameter request contains the USSD message.

3. The method of claim 1, wherein the first Diameter request comprises a User Data Request (UDR) in accordance with a Diameter Sh communication protocol, and
   wherein the first Diameter request has a User Data field and the USSD message is specified within the User Data field.

4. The method of claim 1, wherein:
   the first Diameter request comprises a User Data Request (UDR) in accordance with a Diameter Sh communication protocol; and
   the Diameter answer comprises a User Data Answer (UDA) in accordance with the Diameter Sh communication protocol.

5. The method of claim 1, wherein determining, by the TAS, that the payload of the SIP INVITE message contains the USSD message includes determining a user part of an SIP Uniform Resource Identifier (URI) of the SIP INVITE message includes the USSD message, and a "user" URI parameter is set to a "dialstring" value.

6. The method of claim 1, wherein the text string comprises a service code.

7. A telephony application server (TAS), comprising:
   a network communication interface that communicates over a communications network using Internet Protocol (IP);
   one or more processors; and
   one or more non-transitory computer-readable media storing computer-executable instructions that, when executed by the one or more processors, cause the one or more processors to perform actions comprising:
      establishing a logical communication interface with a Home Subscriber Service (HSS) of an IP Multimedia Subsystem (IMS) via the network communication interface in accordance with a Diameter Sh communication protocol;
      receiving a Session Initiation Protocol (SIP) INVITE message via the network communication interface;

determining that the SIP INVITE message contains an Unstructured Supplementary Service Data (USSD) message, the USSD message comprising a text string;

sending a request to the HSS via the network communication interface using the logical communication interface, wherein the request contains the USSD message;

receiving an answer from the HSS via the network communication interface using the logical communication interface, wherein the answer contains a USSD response; and sending a SIP BYE message that contains the USSD response.

8. The telephony application server of claim 7, the actions further comprising specifying a predetermined Data-Reference Attribute-Value Pair (AVP) in the request to indicate that the request contains the USSD message.

9. The telephony application server of claim 7, wherein:
the request comprises a User Data Request (UDR) of the Diameter Sh communication protocol;
the UDR has a User Data field; and
the USSD message is specified within the User Data field.

10. The telephony application server of claim 7, wherein the request comprises a User Data Request (UDR) of the Diameter Sh communication protocol.

11. The telephony application server of claim 7, wherein:
the request comprises a User Data Request (UDR) of the Diameter Sh communication protocol; and
the answer comprises a User Data Answer (UDA) of the Diameter Sh communication protocol.

12. A Home Subscriber Service (HSS) of an IP Multimedia Subsystem (IMS), comprising:
a network communication interface that communicates over a communications network using Internet Protocol (IP);
one or more processors;
one or more non-transitory computer-readable media storing computer-executable instructions that, when executed by the one or more processors, cause the one or more processors to perform actions comprising:
establishing a first logical communication interface with a Telephony Application Server (TAS) via the network communication interface in accordance with a Diameter Sh communication protocol;
receiving a request from the TAS using the first Diameter Sh interface;
determining that a User Data field of the request received using the first Diameter Sh interface contains an Unstructured Supplementary Service Data (USSD) message; and
sending the USSD message to a USSD service;
receiving a USSD response from the USSD service; and
sending the USSD response to the TAS using the first Diameter Sh interface.

13. The HSS of claim 12, the actions further comprising:
establishing a second logical communication interface via the network communication interface in accordance with the Diameter Sh communication protocol, the second logical communication interface being between the HSS and the USSD service;
wherein the sending the USSD message uses the second logical communication interface.

14. The HSS of claim 12, wherein determining that the request contains the USSD message comprises determining that the request specifies a predetermined Data-Reference Attribute-Value Pair (AVP) corresponding to Sh-based USSD messages.

15. The HSS of claim 12, wherein the request comprises a User Data Request (UDR) of the Diameter Sh communication protocol.

16. A Home Subscriber Service (HSS) of an IP Multimedia Subsystem (IMS), comprising:
a network communication interface that communicates over a communications network using Internet Protocol (IP);
one or more processors;
one or more non-transitory computer-readable media storing computer-executable instructions that, when executed by the one or more processors, cause the one or more processors to perform actions comprising:
establishing a first logical communication interface with a Telephony Application Server (TAS) via the network communication interface in accordance with a Diameter Sh communication protocol;
receiving a request from a USSD service;
determining that the request contains an Unstructured Supplementary Service Data (USSD) message;
sending the request to the TAS using the first Diameter Sh interface;
receiving a response from the TAS using the first Diameter Sh interface;
determining that a User Data field of the response contains a USSD response; and
sending the response to the USSD service.

17. The HSS of claim 16, the actions further comprising:
establishing a second logical communication interface with the USSD service via the network communication interface in accordance with the Diameter Sh communication protocol; and
wherein the request is received from the USSD service using the second Diameter Sh interface.

18. The HSS of claim 16, wherein determining that the request contains the USSD message comprises determining that the request specifies a predetermined Data-Reference Attribute-Value Pair (AVP).

19. The HSS of claim 16, wherein the request comprises a Push Notification Request (PNR) of the Diameter Sh communication protocol.

20. The HSS of claim 16, wherein:
the request comprises a Push Notification Request (PNR) of the Diameter Sh communication protocol; and
the PNR has a User Data field.

* * * * *